(12) United States Patent
Huang

(10) Patent No.: US 11,175,765 B1
(45) Date of Patent: Nov. 16, 2021

(54) TOUCHPAD MODULE AND COMPUTING DEVICE INCLUDING THE SAME

(71) Applicant: Primax Electronics Ltd., Taipei (TW)

(72) Inventor: Tai-Sou Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/183,995

(22) Filed: Feb. 24, 2021

(30) Foreign Application Priority Data

Jan. 6, 2021 (TW) .................................. 110100478

(51) Int. Cl.
| | |
|---|---|
| *G06F 3/041* | (2006.01) |
| *G06F 3/0354* | (2013.01) |
| *G06F 1/16* | (2006.01) |
| *H01H 21/24* | (2006.01) |
| *G06F 3/01* | (2006.01) |

(52) U.S. Cl.
CPC .......... *G06F 3/0414* (2013.01); *G06F 1/1692* (2013.01); *G06F 3/017* (2013.01); *G06F 3/03547* (2013.01); *H01H 21/24* (2013.01)

(58) Field of Classification Search
CPC ....... G06F 3/03547; G06F 1/169; G06F 3/041
USPC .......... 345/157, 173, 174; 178/18.01, 18.03, 178/18.06
See application file for complete search history.

(56) References Cited

U.S. PATENT DOCUMENTS

| 10,521,029 | B1 * | 12/2019 | Huang | .................... H01H 21/86 |
| 2019/0243475 | A1 * | 8/2019 | Huang | ................ G06F 3/03547 |
| 2019/0384426 | A1 * | 12/2019 | Huang | .................. G06F 3/0362 |

* cited by examiner

*Primary Examiner* — Koosha Sharifi-Tafreshi
(74) *Attorney, Agent, or Firm* — Kirton McConkie; Evan R. Witt

(57) ABSTRACT

A touchpad module includes a substrate, a touch member, a switch, an elastic element and at least four protrusion structures. The substrate includes at least four first openings. A bottom surface of the touch member faces a top surface of the substrate. The switch is coupled with the bottom surface of the touch member. When any point of the touch member is pressed down, the switch is in contact with the substrate. The elastic element includes a fixed part and a movable part. The fixed part is coupled with a portion of a bottom surface of the substrate. The movable part is arranged around the fixed part. The movable part is located beneath the at least four first openings. The at least four protrusion structures are coupled with the touch member and inserted into the corresponding first openings.

11 Claims, 12 Drawing Sheets

TOUCHPAD MODULE AND COMPUTING DEVICE INCLUDING THE SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 221 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 1, 2 and 3, a fixing frame 211 is concavely formed in a casing 21 of the notebook computer 2. The touchpad module 10 is installed in the fixing frame 211. The touchpad module 10 comprises a supporting structure 11, a triggering part 12 and a touch member 13. The touch member 13 is located over the supporting structure 11 and the triggering part 12. The touch member 13 of the touchpad module 10 is connected with the supporting structure 11. Consequently, the touch member 13 of the touchpad module 10 can be swung relative to the triggering part 12 by using the supporting structure 11 as a fulcrum. The touchpad module 10 further comprises a switch 14. The switch 14 is installed on a bottom surface of the touch member 13 and aligned with the triggering part 12.

Please refer to FIGS. 2 and 3. While the touch member 13 is pressed down by the user, the touch member 13 is swung downwardly relative to the triggering part 12 by using the supporting structure 11 as a fulcrum. When the switch 14 of the touchpad module 10 is pushed by the triggering part 12, the switch 14 is triggered to generate a switch signal to the notebook computer 2. According to the switch signal, the notebook computer 2 executes a corresponding function. When the touch member 13 is no longer pressed by the user, the touch member 13 is swung upwardly relative to the triggering part 12 in response to the elastic force of the supporting structure 11. Consequently, the touch member 13 is returned to its original position.

Generally, the supporting structure 11 of the touchpad module 10 is connected with the upper component and the lower component through iron elements or plastic structures (e.g., sponge structures). Consequently, as the iron elements or the plastic structures are subjected to deformation, the touch member 13 can be swung upwardly or downwardly. However, the conventional touchpad module 10 still has some drawbacks. For example, the position of the touch member 13 that is aligned with the supporting structure 11 cannot be pressed down, but only the position of the touch member 13 that is not aligned with the supporting structure 11 can be pressed down. In other words, the touch member 13 of the touchpad module 10 can be locally pressed down. Due to the structural design of the touchpad module 10, it is unable to press down the whole surface of the touch member 13.

Therefore, there is a need of providing an improved touchpad module in order to overcome the above drawbacks.

SUMMARY OF THE INVENTION

An object of the present invention provides a touchpad module. When any point of the whole plane of a touch member of the touchpad module is pressed down, the switch can be triggered.

In accordance with an aspect of the present invention, a touchpad module for a computing device is provided. The touchpad module is installed within a fixing frame of the computing device. The touchpad module includes a substrate, a touch member, a switch, an elastic element and at least four protrusion structures. The substrate includes at least four first openings, which are separated from each other. A bottom surface of the touch member faces a top surface of the substrate. The switch is coupled with the bottom surface of the touch member. When any point of the touch member is pressed down, the switch is in contact with the substrate. The elastic element is located beneath the substrate. The elastic element includes a fixed part and a movable part. The fixed part is coupled with a portion of a bottom surface of the substrate. The movable part is adjacent to the fixed part and arranged around the fixed part. The movable part is located beneath the at least four first openings of the substrate. The at least four protrusion structures are coupled with the touch member and inserted into the corresponding first openings, respectively. When the any point of the touch member is pressed down, the corresponding protrusion structure is moved downwardly to press down a portion of the movable part of the elastic element.

In an embodiment, the substrate includes a triggering part, which is protruded from the substrate and substantially aligned with the switch. When the any point of the touch member is pressed down, the switch is in contact with the triggering part of the substrate.

In an embodiment, the movable part of the elastic element includes at least four second openings, and the at least four second openings are substantially aligned with the corresponding first openings, respectively. A diameter of each second opening is smaller than a diameter of the corresponding first opening. The at least four protrusion structures are aligned with the corresponding second openings, respectively. When the any point of the touch member is pressed down, the portion of the movable part near the corresponding second opening is pressed down by the corresponding protrusion structure.

In an embodiment, the at least four protrusion structures are at least four hollow studs, and the touchpad module further includes at least four fastening elements corresponding to the at least four hollow studs, respectively. Each of the fastening elements is penetrated through the corresponding second openings and tightened into the corresponding hollow stud.

In an embodiment, the fixed part of the elastic element is connected with the portion of the bottom surface of the substrate by laser welding, or the fixed part of the elastic element is coupled with the portion of the bottom surface of the substrate through an adhesive layer.

In an embodiment, the fixed part of the elastic element is substantially aligned with the switch.

In an embodiment, the touchpad module further includes a reinforcement plate. The reinforcement plate is coupled with the bottom surface of the touch member. The at least four protrusion structures are coupled with the touch member through the reinforcement plate.

In an embodiment, a vertical projection of a peripheral portion of the reinforcement plate is partially overlapped with a vertical projection of an upper part of the fixing frame.

In an embodiment, the elastic element further includes a hollow part. The hollow part is adjacent to the movable part. The hollow part and the movable part are arranged around the fixed part.

In an embodiment, the touch member includes a circuit board and a covering plate. The covering plate is located over the circuit board. The switch is connected with a bottom surface of the circuit board.

In accordance with another aspect of the present invention, a computing device is provided. The computing device includes a casing, a processor and a touchpad module. The casing has a fixing frame recessed inward. The processor is disposed within the casing. The touchpad module is disposed within the fixing frame and electrically connected with the processor. The touchpad module has the structure as mentioned above.

From the above descriptions, the present invention provides the touchpad module. In accordance with a feature of the present invention, the touchpad module is equipped with the protrusion structures, the substrate with the first openings and the elastic element. Consequently, when any point of the touch member is pressed down, at least a portion of the touch member is moved downwardly. Consequently, the protrusion structure is moved downwardly to press down at least a portion of the elastic element through the corresponding first opening. At the same time, the switch is in contact with the substrate and triggered. After the pressing force is eliminated, the at least portion of the touch member, the protrusion structure and the at least portion of the elastic element are returned to their original positions. Consequently, when any point of the whole plane of the touch member is pressed down, the switch can be triggered. In other words, the problems that the touch member of the conventional touchpad module can only be pressed down partially can be overcome.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
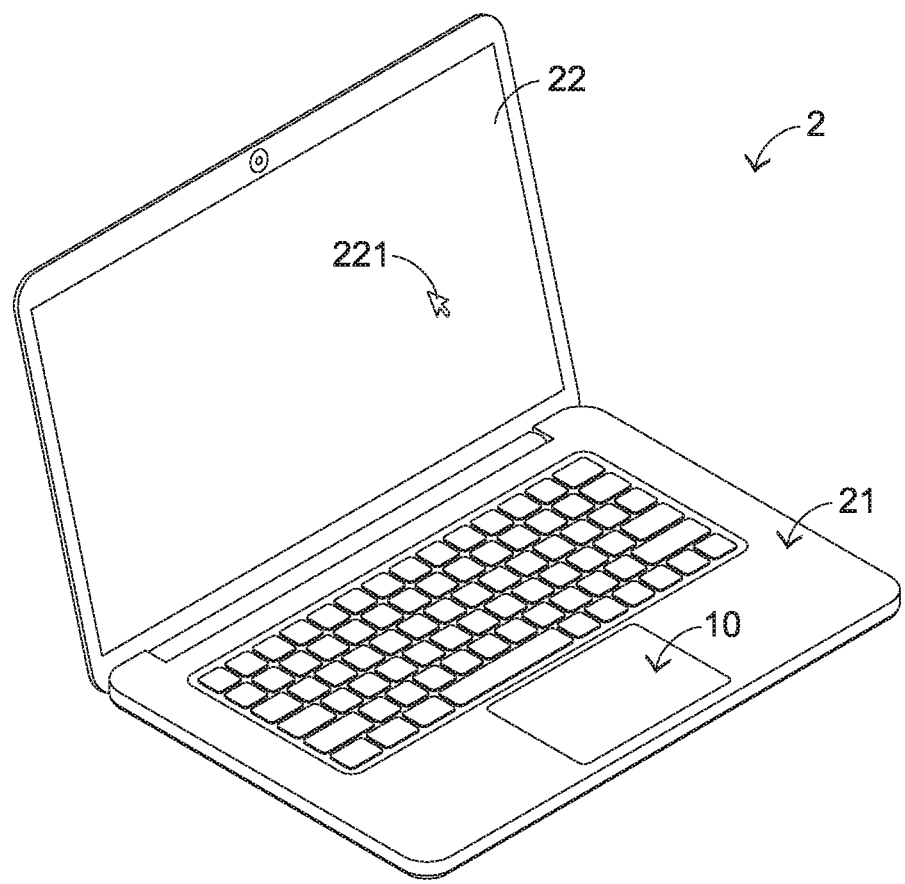
FIG. 1 schematically illustrates a conventional notebook computer with a touchpad module.
Figure 2:
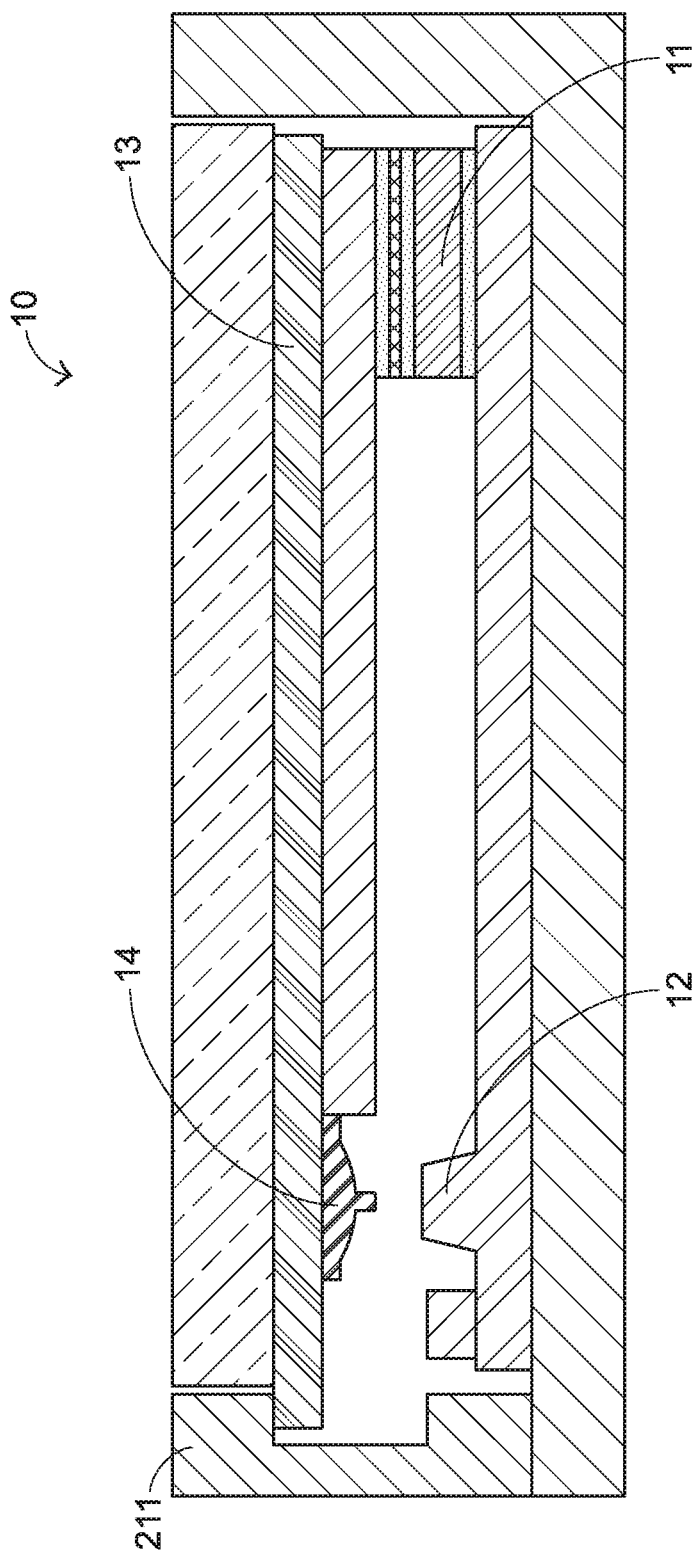
FIG. 2 is a schematic cross-sectional view illustrating the touchpad module as shown in FIG. 1, in which the touchpad module is not pressed down.
Figure 3:
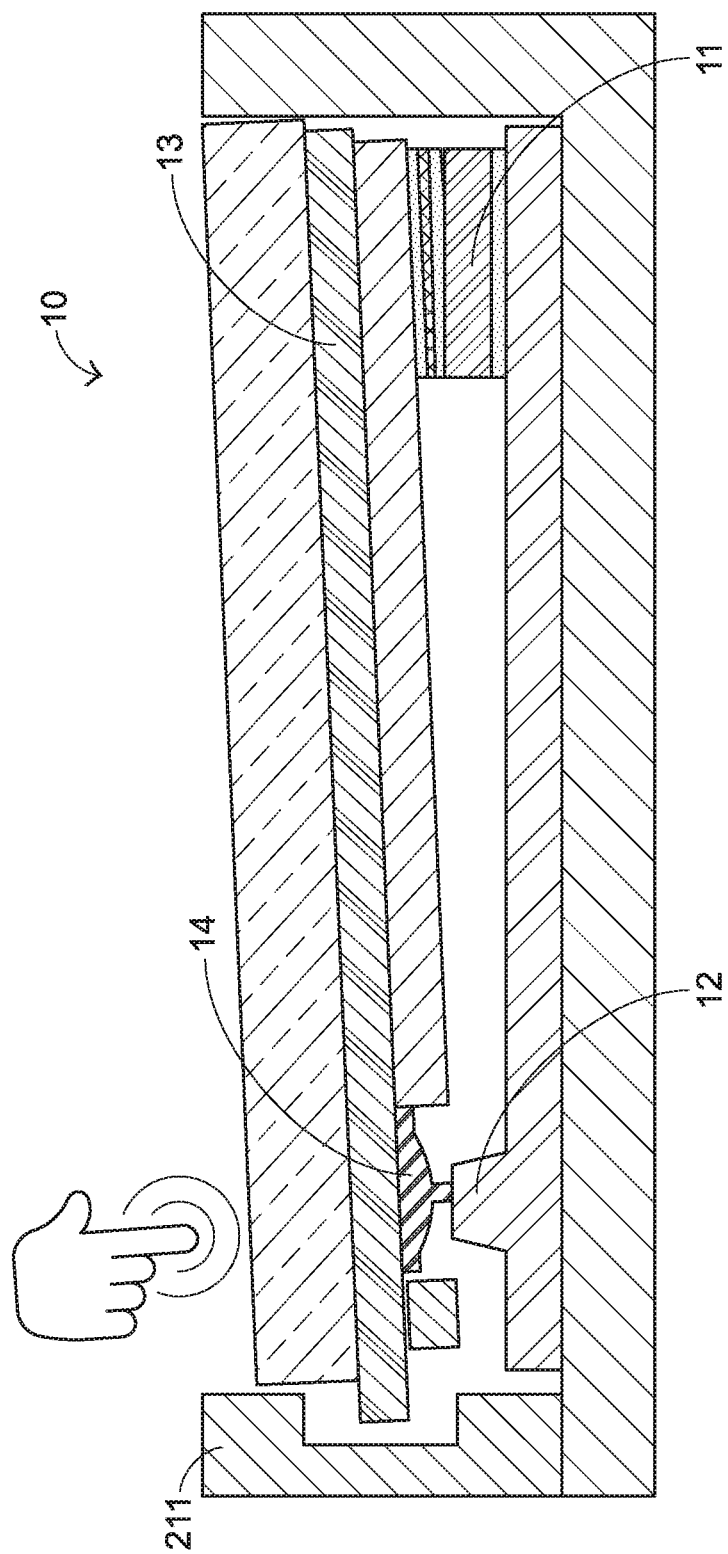
FIG. 3 is a schematic cross-sectional view illustrating the touchpad module as shown in FIG. 2, in which the touchpad module is pressed down.
Figure 4:
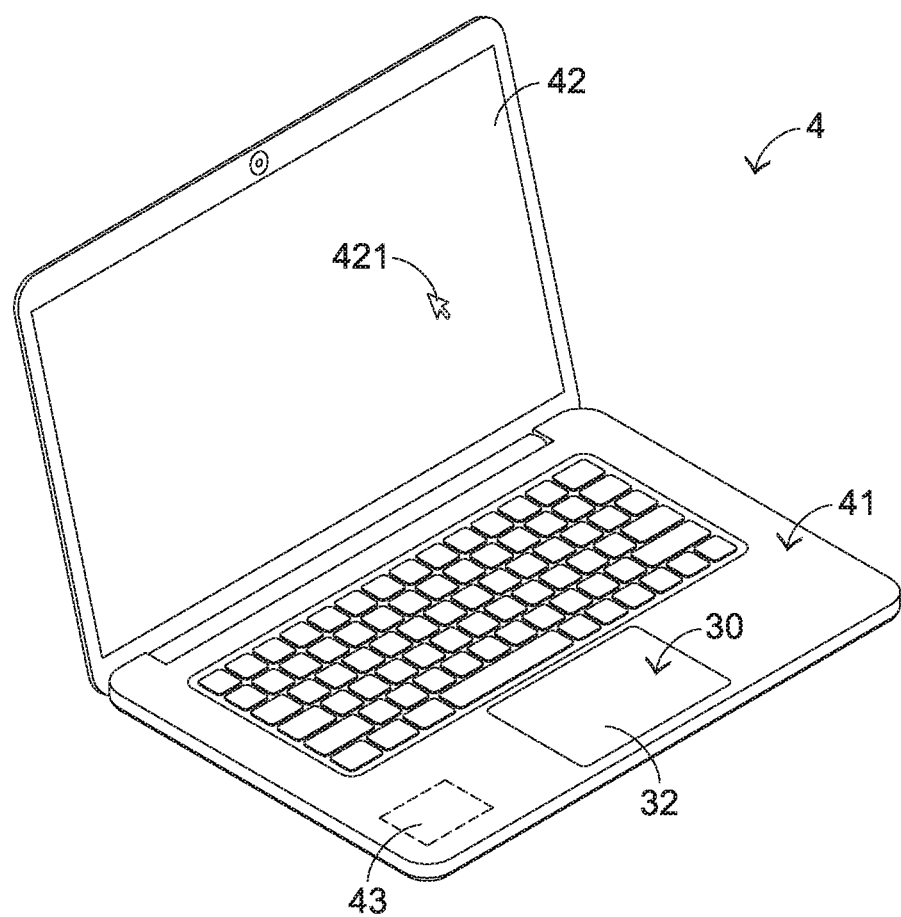
FIG. 4 is a schematic perspective view illustrating the outer appearance of a computing device with a touchpad module according to a first embodiment of the present invention.

FIG. 4 is a schematic perspective view illustrating the outer appearance of a computing device with a touchpad module according to a first embodiment of the present invention. An example of the computing device 4 includes but is not limited to a notebook computer. In an embodiment, the computing device 4 comprises a touchpad module 30, a casing 41, a display screen 42 and a processor 43. The processor 43 is disposed within the casing 41. Moreover, the processor 41 is used for processing electronic signals of the computing device 4. Moreover, a fixing frame 411 is concavely formed in the casing 41 (see FIG. 5). The touchpad module 30 is disposed within the fixing frame 411 and electrically connected with the processor 43. In addition, at least a portion of the touchpad module 30 is exposed outside so as to be touched by the user's finger. Consequently, the user may operate the touchpad module 30 to control the computing device 4. For example, in case that the user's finger is placed on the touchpad module 30 and slid on the touchpad module 30, a cursor 421 shown on the display screen 42 is correspondingly moved. Moreover, in case that the touchpad module 30 is pressed down by the user's finger, the computing device 4 implements a specified function.

The other structures of the touchpad module 30 will be described in more details as follows.

Figure 5:
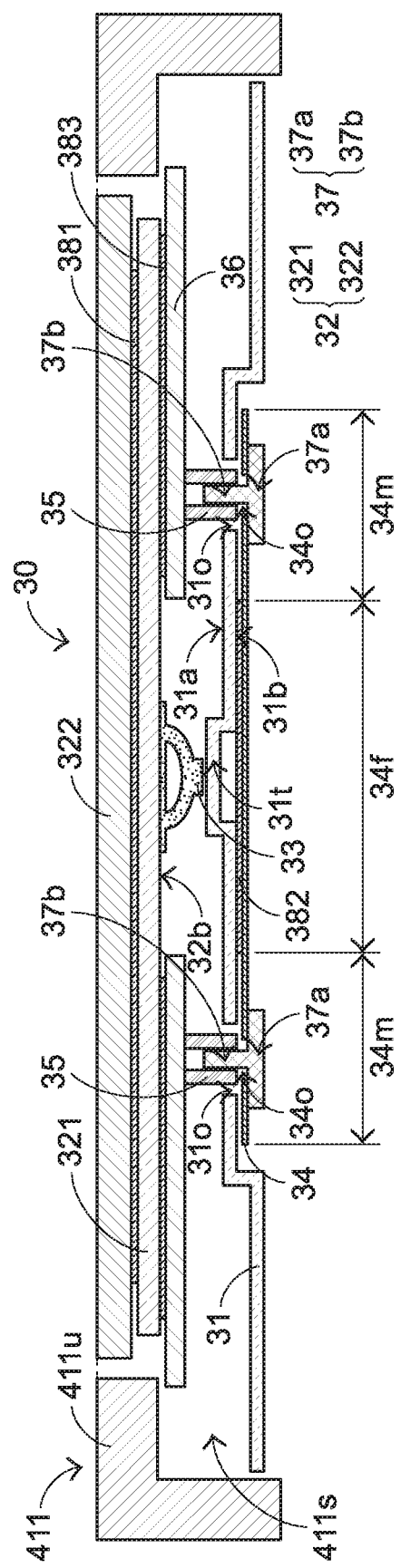
FIG. 5 is a schematic side view illustrating the touchpad module according to an embodiment of the present invention.
Figure 6:
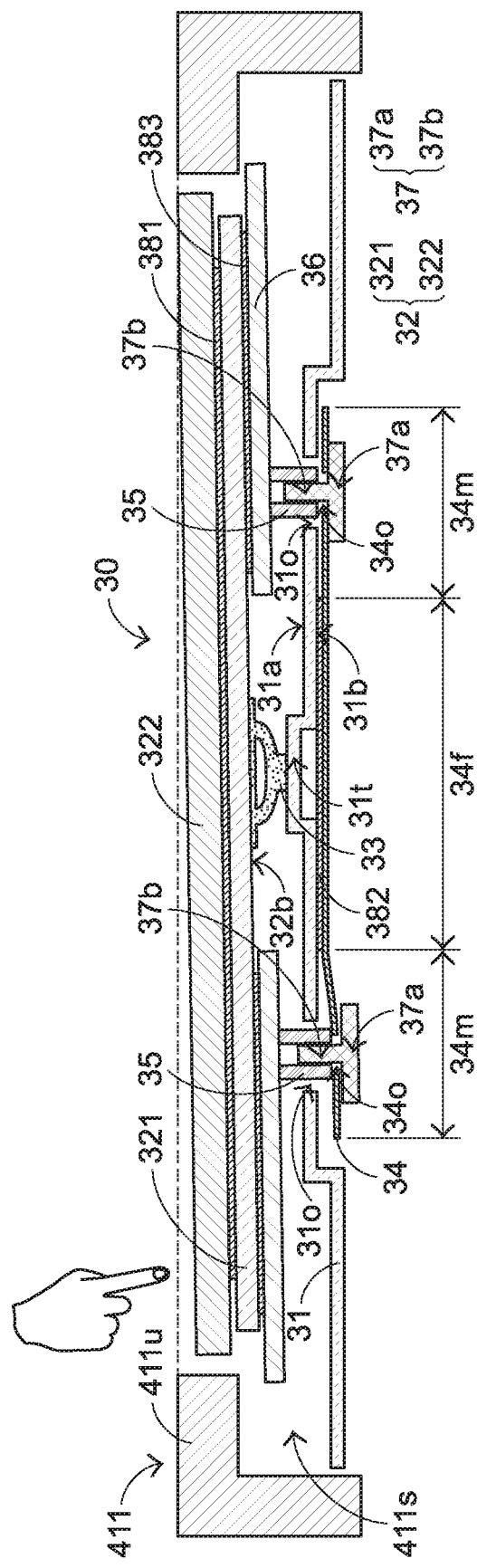
FIG. 6 is a schematic side view illustrating the touchpad module as shown in FIG. 5, in which the touchpad module is pressed down.
Figure 7:
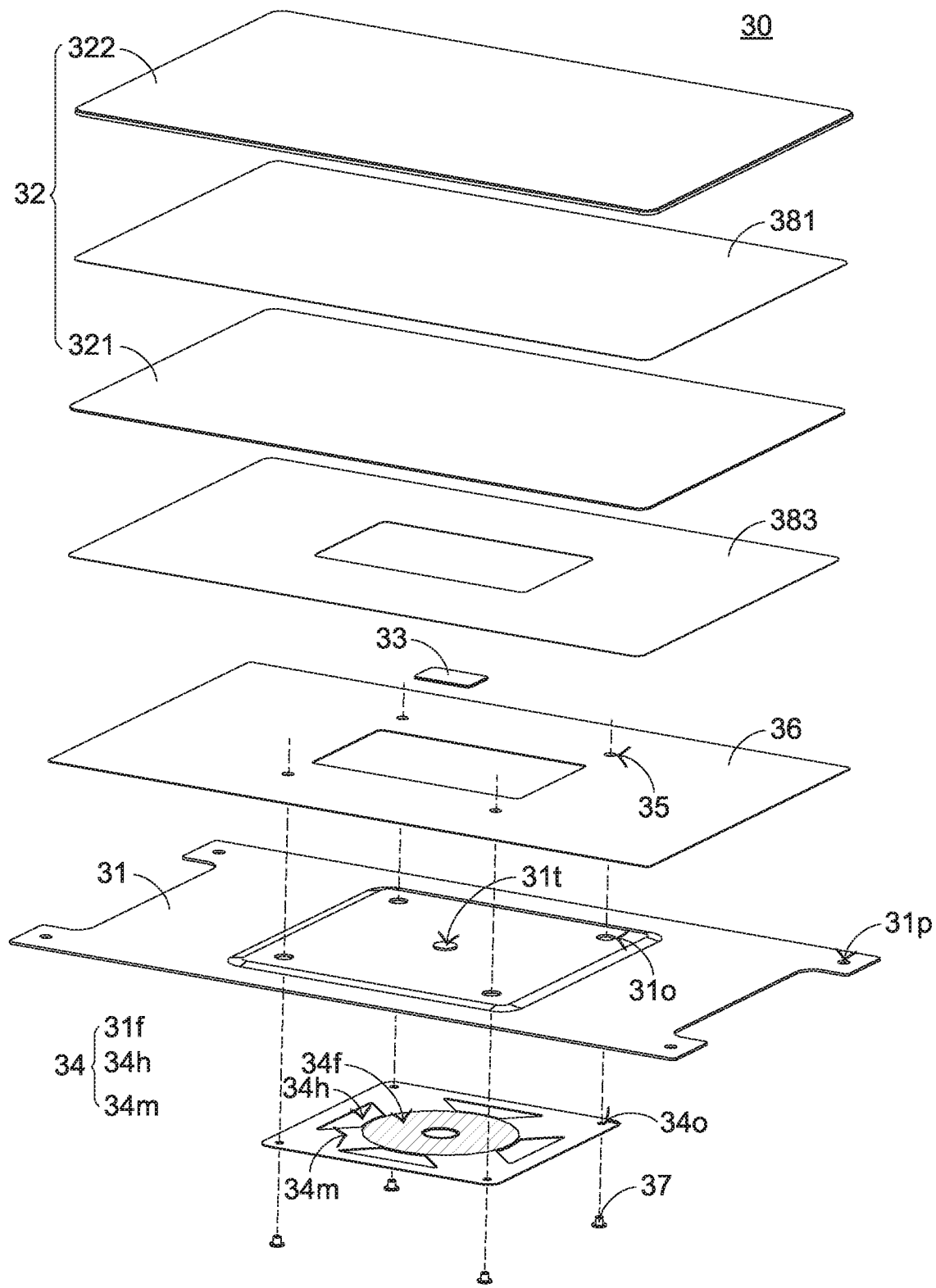
FIG. 7 is a schematic exploded view illustrating the touchpad module according to the embodiment of the present invention.

FIG. 5 is a schematic side view illustrating the touchpad module according to an embodiment of the present invention. FIG. 6 is a schematic side view illustrating the touchpad module as shown in FIG. 5, in which the touchpad module is pressed down. FIG. 7 is a schematic exploded view illustrating the touchpad module according to the embodiment of the present invention.

Please refer to FIGS. 5, 6 and 7. The fixing frame 411 of the computing device 4 comprises an accommodation space 411s. The touchpad module 30 is accommodated within the accommodation space 411s. In an embodiment, the touchpad module 30 comprises a substrate 31, a touch member 32, a switch 33, an elastic element 34 and at least four protrusion structures 35.

Please refer to FIGS. 5, 6 and 7 again. The substrate 31 is disposed within the fixing frame 411. The substrate 31 comprises at least four first openings 31o, which are separated from each other. In an embodiment, the substrate 31 is a rigid plate that is made of metallic material or alloy. It is noted that the example of the substrate 31 is not restricted. For example, in another embodiment, the substrate 31 is a flat plate structure or a plate structure with a raised platform. In the embodiment as shown in FIG. 5, the substrate 31 comprises a raised platform and a triggering part 31t. The triggering part 31t is disposed on the raised platform. The structure of the substrate 31 is not restricted. In practice, the side view profile of the substrate 31 may be designed according to the thicknesses of the associated components and the distances between associated components.

Please refer to FIGS. 5 and 6 again. In an embodiment, the triggering part 31t is protruded from the substrate 31 and substantially aligned with the switch 33. The switch 33 is installed on the touch member 32. The installation position of the switch 33 is not restricted as long as the switch 33 is in contact with the triggering part 31t of the substrate 31 when any position of the touch member 32 is pressed down. In this context, the term "two components are substantially aligned with each other" indicates that the projection areas of two components along the vertical direction (i.e., along the thickness directions of the components) are completely overlapped or nearly completely overlapped.

The touch member 32 is disposed within the fixing frame 411. Moreover, a bottom surface 32b of the touch member 32 faces a top surface 31a of the substrate 31. In an embodiment, the touch member 32 comprises a circuit board 321 and a covering plate 322. The covering plate 322 is located over the circuit board 321. In an embodiment, the circuit board 321 and the covering plate 322 are combined together through an adhesive layer 381. For example, the adhesive layer 381 is made of a pressure sensitive adhesive (PSA). It is noted that the way of combining the circuit board 321 with the covering plate 322 is not restricted. Preferably but not exclusively, the covering plate 322 is made of glass or any other appropriate material.

The switch 33 is disposed within the fixing frame 411. In addition, the switch 33 is coupled with the bottom surface 32b of the touch member 32. Please refer to FIGS. 5 and 6 again. The installation position of the switch 33 needs to be specially designed. Consequently, when any point of the touch member 32 is pressed down, a portion of the touch member 32 is moved toward the substrate 31. When the switch 33 is in contact with the substrate 31 (e.g., the triggering part 31t), the switch 33 is triggered to generate an electronic signal to the computing device 4. According to the electronic signal, the computing device 4 implements a corresponding function. When the pressing force exerted on the touch member 32 is eliminated, the pressed portion of the touch member 32 is returned to its original position in response to an elastic restoring force of the elastic element 34. In an embodiment, the switch 33 is a dome switch.

The elastic element 34 is disposed within the fixing frame 411. In addition, the elastic element 34 is located beneath the substrate 31. When the elastic element 34 is locally pressed down, the elastic element 34 is moved downwardly. When the pressing force is eliminated, the elastic element 34 is returned to its original position. The elastic element 34 has resilience. Preferably but not exclusively, the elastic element 34 is made of metallic material or alloy. In an embodiment, the thickness of the elastic element 34 is smaller than the thickness of the substrate 31. The elastic element 34 comprises a fixed part 34f and a movable part 34m. The fixed part 34f and the movable part 34m will be illustrated in more details.

The fixed part 34f is coupled with a portion of a bottom surface 31b of the substrate 31. In an embodiment, the fixed part 34f is connected with the portion of the bottom surface 31b of the substrate 31 through a laser welding means. Alternatively, the fixed part 34f is bonded on the portion of the bottom surface 31b of the substrate 31 through an adhesive layer 382. For example, the adhesive layer 382 is made of a pressure sensitive adhesive (PSA). In an embodiment, the fixed part 34f is substantially aligned with the switch 33. In an embodiment, the fixed part 34f is substantially aligned with the triggering part 31t. In an embodiment, the top view area (or side view width) of the fixed part 34f is larger than the top view area (or side view width) of the switch 33 and the top view area (or side view width) of the trigger part 31t.

Please refer to FIGS. 5 and 6. In case that the top view area (or side view width) of the elastic element 34 is fixed, the top view area (or side view width) of the fixed part 34f can be adjusted according to the required pressing force. For example, if a larger pressing force is required to press down the touch member 32 to trigger the switch, the fixed part 34f may have a larger top view area (or side view width). Whereas, if a smaller pressing force is required to press down the touch member 32 to trigger the switch, the fixed part 34f may have a smaller top view area (or side view width).

The movable part 34m is laterally adjacent to the fixed part 34f and arranged around the fixed part 34f. In addition, the movable part 34m is located beneath the at least four first openings 31o of the substrate 31. In an embodiment, the movable part 34m of the elastic element 34 comprises at least four second openings 34o. The at least four second openings 34o are substantially aligned with the corresponding first openings 31o, respectively. In addition, the diameter of each second opening 34o is smaller than the diameter of the corresponding first opening 31o.

The at least four protrusion structures 35 are coupled with the touch member 32 and inserted into the corresponding first openings 31o, respectively. That is, the protrusion structures 35 are aligned with the corresponding first openings 31o, respectively. As shown in FIG. 6, the protrusion structures 35 are located near the movable part 34m of the elastic element 34 when the touch member 32 is not pressed down. As shown in FIG. 6, the protrusion structure 35 is moved downwardly to push a portion of the movable part 34m of the elastic element 34 when the touch member 32 is pressed down. In an embodiment, the at least four protrusion structures 35 are aligned with the corresponding second openings 34o, respectively. When any point of the touch member 32 is pressed down, the portion of the movable part 34m near the corresponding second opening 34o is pressed down by the corresponding protrusion structure 35. Preferably but not exclusively, the protrusion structures 35 are made of metallic material or alloy.

In an embodiment, the at least four protrusion structures 35 are at least four hollow studs. The touchpad module 30 comprises at least four fastening elements 37 corresponding to the at least four hollow studs, respectively. The fastening elements 37 are penetrated through the corresponding second openings 34o and tightened into the corresponding hollow studs, respectively. Each fastening element 37 comprises a head portion 37a and a threaded portion 37b. The threaded portion 37b is tightened into the corresponding hollow stud. As shown in FIG. 5, the movable part 34m is located near the bottom surface of the substrate 31 when the touch member 32 is not pressed down. Please refer to FIG. 6. When any point of the touch member 32 is pressed down, the hollow stud near the pressed point is moved downwardly and in contact with a portion of the movable part 34m of the elastic element 34. Consequently, the movable part 34m is moved in the direction away from the bottom surface of the substrate 31.

It is noted that numerous modifications and alterations may be made while retaining the teachings of the invention. For example, in another embodiment, the protrusion structures (e.g., solid posts or hollow studs) are contacted with portions of the movable part of the elastic element (not shown) through a laser welding means. When any point of the touch member is pressed down, the corresponding protrusion structure and the corresponding region of the movable part of the elastic element are moved downwardly. Consequently, the movable part is moved in the direction away from the bottom surface of the substrate.

Please refer to FIGS. 5 and 6 again. In some embodiments, the touchpad module 30 further comprises a reinforcement plate 36. The reinforcement plate 36 is coupled with the bottom surface 32b of the touch member 32. The at least four protrusion structures 35 are coupled with the touch member 32 through the reinforcement plate 36. In an embodiment, the reinforcement plate 36 is bonded on the touch member 32 through an adhesive layer 383. For example, the adhesive layer 383 is made of a pressure sensitive adhesive (PSA). In an embodiment, the protrusion structures 35 are contacted with the bottom surface of the reinforcement plate 36. In an embodiment, the protrusion structures 35 are connected with the bottom surface of the reinforcement plate 36 through a laser welding means. In an embodiment, the protrusion structures are directly connected with the bottom surface of the circuit board (not shown). Preferably but not exclusively, the reinforcement plate 36 is made of metallic material or alloy.

Please refer to FIGS. 5 and 6 again. In this embodiment, the edge of the reinforcement plate 36 is extended beyond the edge of the touch member 32. In some embodiments, the vertical projection of the peripheral portion of the reinforcement plate 36 is partially overlapped with the vertical projection of an upper part 411u of the fixing frame 411. Under this circumstance, the peripheral portion of the reinforcement plate 36 can be used as a stopping structure. Consequently, when any point of the touch member 32 is pressed down, an opposite side of the touch member 32 and the reinforcement plate 36 are uplifted. When the peripheral portion of the reinforcement plate 36 is stopped by the upper part 411u of the fixing frame 411, the uplifted portion of the touch member 32 will not be further raised over the top edge of the fixing frame 411.

Figure 8:
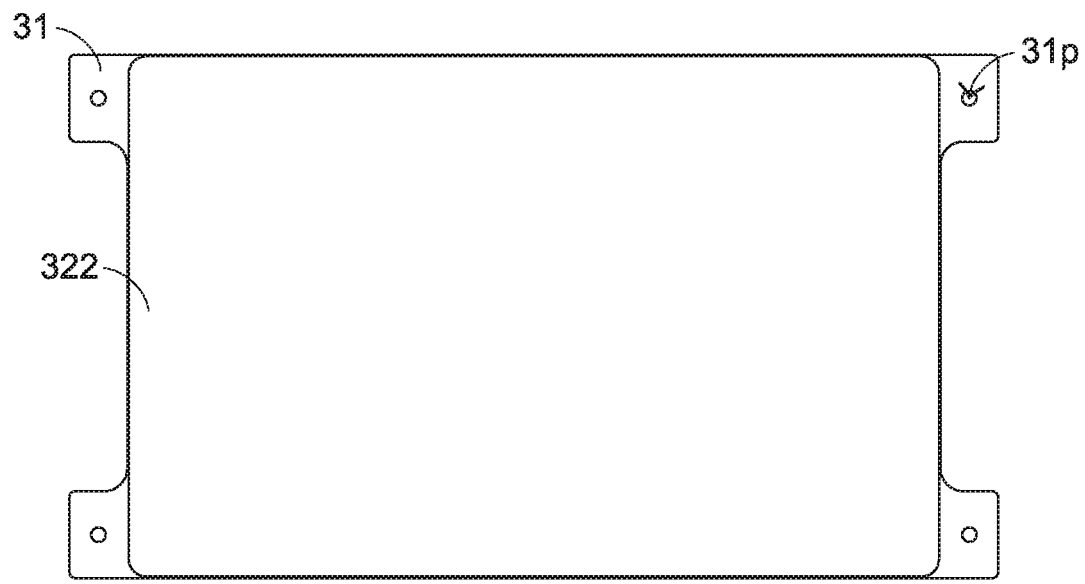
FIG. 8 is a schematic top view illustrating the touchpad module as shown in FIG. 7.
Figure 9:
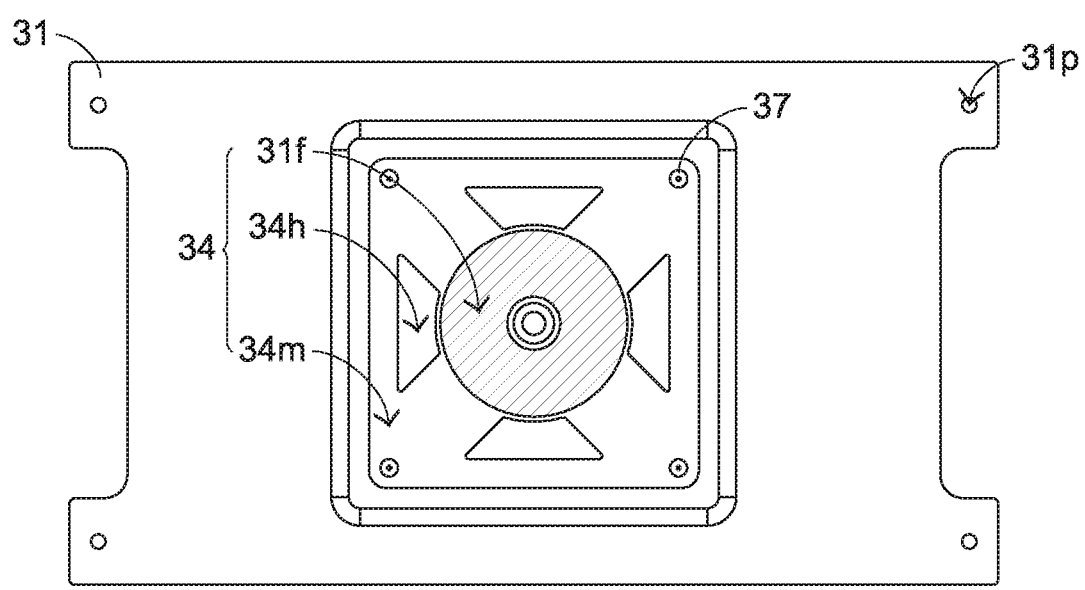
FIG. 9 is a schematic bottom view illustrating the touchpad module as shown in FIG. 7.

FIG. 8 is a schematic top view illustrating the touchpad module as shown in FIG. 7. FIG. 9 is a schematic bottom view illustrating the touchpad module as shown in FIG. 7. Please refer to FIGS. 7, 8 and 9. In an embodiment, the substrate 31 further comprises plural fixing holes 31p. After fastening elements (not shown) are penetrated through the corresponding fixing holes 31p and tightened into the fixing frame of the casing of the computing device, the substrate 31 is fixed on the fixing frame of the casing of the computing device.

Please refer to FIG. 7 again. The four protrusion structures 35 (e.g., hollow studs), the four first openings 31o, the four second openings 34o and the four fastening elements 37 are aligned with each other from top to bottom. Especially, the four protrusion structures 35, the four first openings 31o, the four second openings 34o and the four fastening elements 37 are arranged around the switch 33 in a circular distribution manner or a square distribution manner along a top viewpoint or a bottom viewpoint. In FIGS. 7, 8 and 9, four protrusion structures 35 (e.g., hollow studs), four first openings 31o, four second openings 34o and four fastening elements 37 are shown. It is noted that the numbers of the protrusion structures (e.g., hollow studs), the first openings, the second openings and the fastening elements are not restricted. For example, in another embodiments, five, sixth or more protrusion structures (e.g., hollow studs), the corresponding number of first openings, the corresponding number of second openings and the corresponding number of fastening elements are arranged in a circular distribution manner or a polygonal (e.g., pentagonal or hexagonal) distribution manner along the top viewpoint or the bottom viewpoint.

In an embodiment, the fixed part 34f (e.g., the region indicated by oblique lines as shown in FIGS. 7 and 9) is connected with a portion of the bottom surface of the substrate 31 through a laser welding means. Alternatively, the fixed part 34f is bonded on a portion of the bottom surface of the substrate 31 through an adhesive layer (e.g., the adhesive layer 382 as shown in FIG. 5).

Please refer to FIGS. 7 and 9. In an embodiment, the elastic element 34 further comprises plural hollow parts 34h. The hollow parts 34h are adjacent to the movable part 34m. In addition, the hollow parts 34h and the movable part 34m are arranged around the fixed part 34f. Due to the hollow parts 34h, the elasticity strength of the elastic element 34 is adjustable. For example, if the top view area of the hollow part 34h is very small or zero, a larger pressing force is required to press down the movable part 34m of the elastic element 34. Whereas, if the top view area of the hollow part 34h is larger, a smaller pressing force is sufficient to press down the movable part 34m of the elastic element 34.

Please refer to FIG. 7 again. In an embodiment, the reinforcement plate 36 comprises a hollow portion exposing a portion of the touch member 32 (e.g., a portion of the circuit board 321) and the switch 33.

Figure 10:
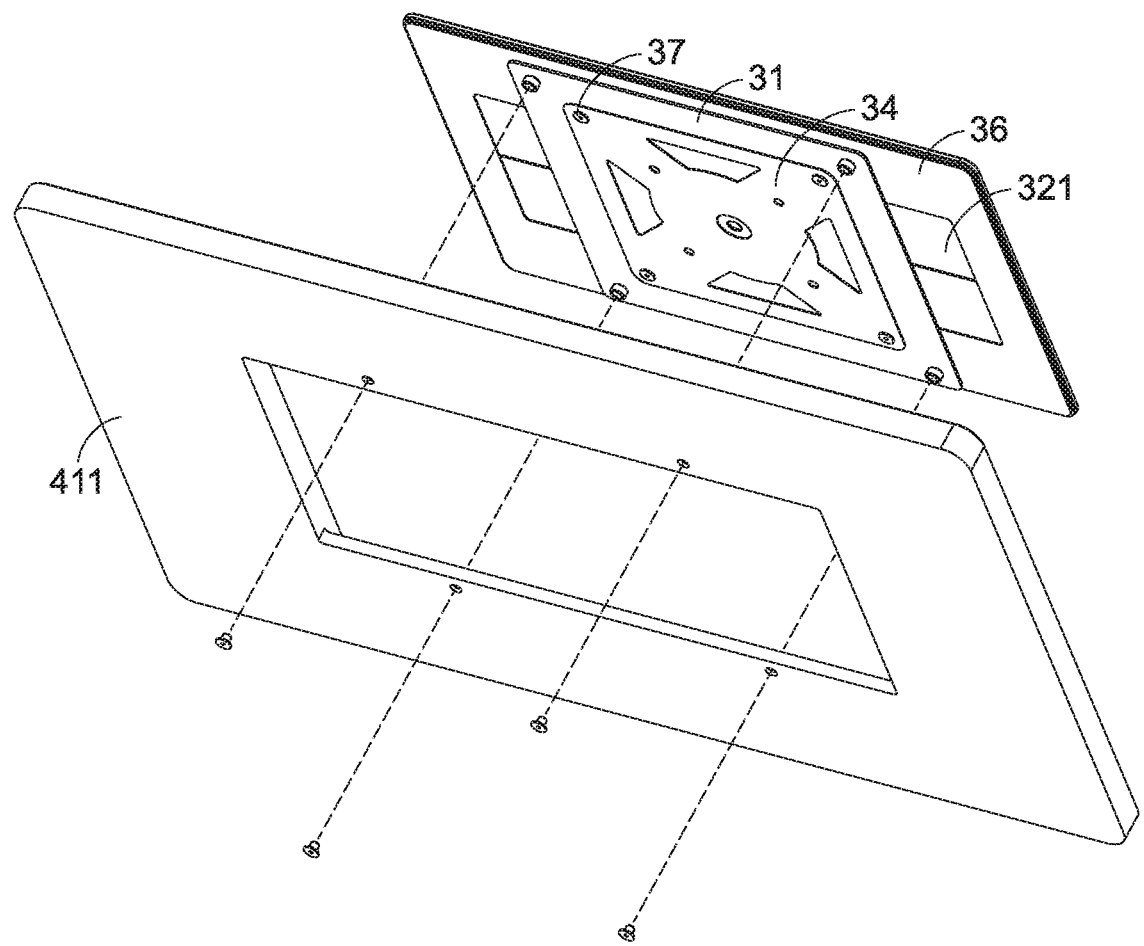
FIG. 10 schematically illustrates a method of installing the touchpad module on the computing device according to an embodiment of the present invention.

FIG. 10 schematically illustrates a method of installing the touchpad module on the computing device according to an embodiment of the present invention. In comparison with the embodiment of FIGS. 7, 8 and 9, the size of the substrate 31 of this embodiment is smaller. Consequently, in addition to the substrate 31 and the elastic element 34, a portion of the reinforcement plate 36 and a portion of the circuit board 321 are visible along the bottom viewpoint. In an embodiment, the substrate 31 is fixed on the fixing frame 411 of the casing of the computing device through the fastening elements and the corresponding fixing holes.

Figure 11:
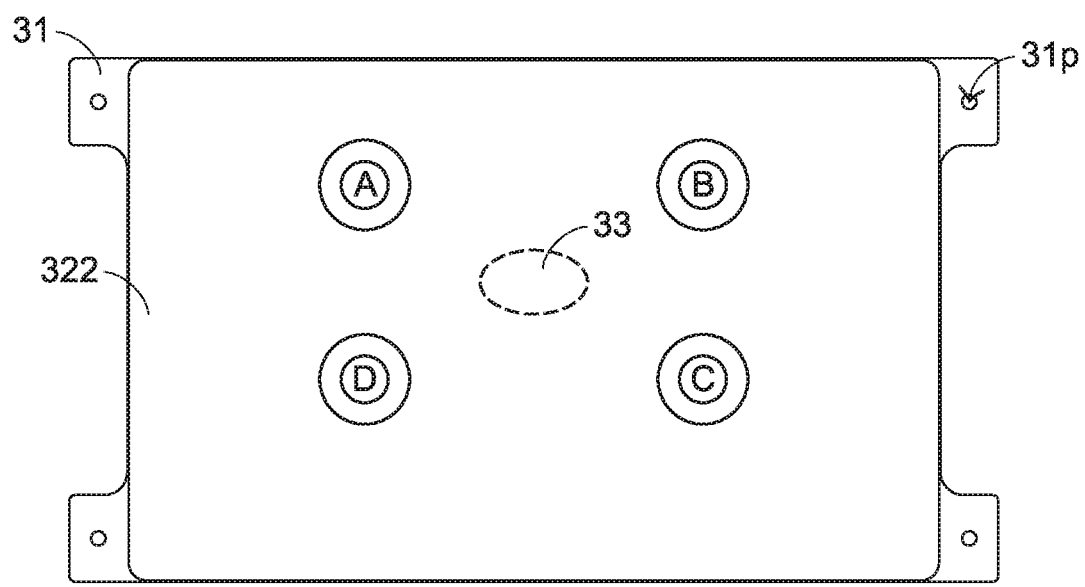
FIG. 11 is a schematic top view illustrating the relationship between some positions and the switch on the touch member of the touchpad module as shown in FIG. 7.

FIG. 11 is a schematic top view illustrating the relationship between some positions and the switch on the touch member of the touchpad module as shown in FIG. 7. As shown in FIG. 11 from the top viewpoint, the switch 33 is located at a middle region of the touch member (including the covering plate 322 and the circuit board) and four protrusion structures (e.g., the protrusion structures 35 (e.g., hollow studs) as shown in FIG. 7) are located at four positions A, B, C and D of the touch member. These protrusion structures can be used as the support posts. Consequently, when any point of the whole plane of the touch member is pressed down, the switch 33 can be triggered. The operation modes corresponding to different depressed points of the whole plane of the touch member will be described as follows.

Please refer to FIG. 11. When the user' finger presses down the position of the touch member corresponding to the switch 33, all of the protrusion structures at the positions A, B, C and D are moved downwardly and the switch 33 is in contact with the substrate 31 (e.g., the triggering part 31t as shown in FIGS. 5 and 6) and triggered. When the user' finger presses down the position A of the touch member, the protrusion structure at the position A is moved downwardly, and the protrusion structures at the positions B and D are slightly moved downwardly, and the protrusion structure at the position C is fixed and used as a fulcrum. In addition, the switch 33 is in contact with the substrate 31 and triggered.

FIGS. 12A, 12B, 12C and 12D schematically illustrate the statues of the touch member in response to some different pressed points.

Figure 12A:
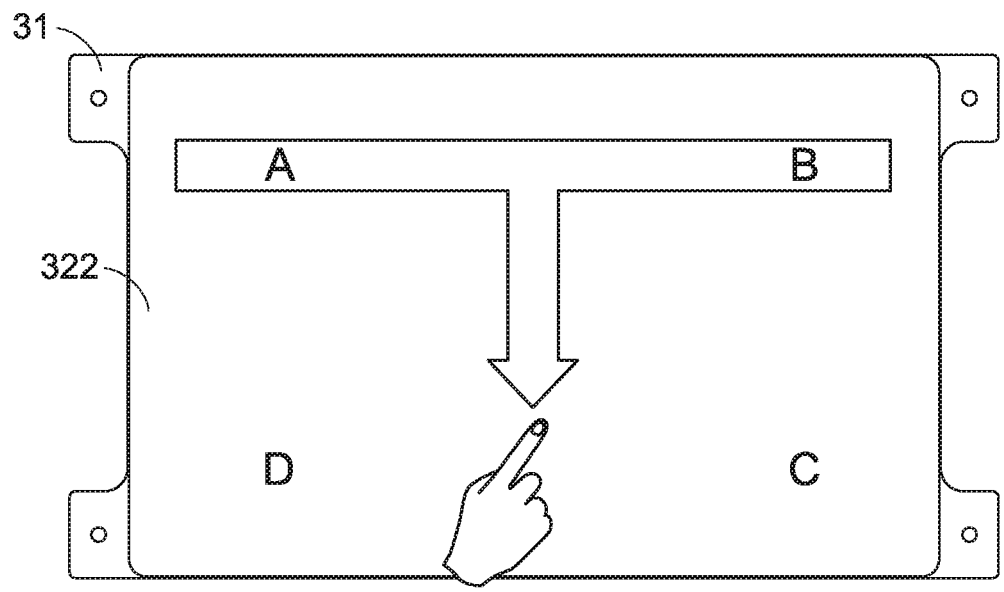
FIGS. 12A, 12B, 12C and 12D schematically illustrate the statues of the touch member in response to some different pressed points.

Please refer to FIG. 12A. When the user' finger presses down the lower side of the touch member, the protrusion structures at the positions C and D are moved downwardly, the protrusion structures at the positions A and B are fixed and used as fulcrums, and the switch 33 between the positions A, B, C and D is in contact with the substrate 31 and triggered.

Figure 12B:
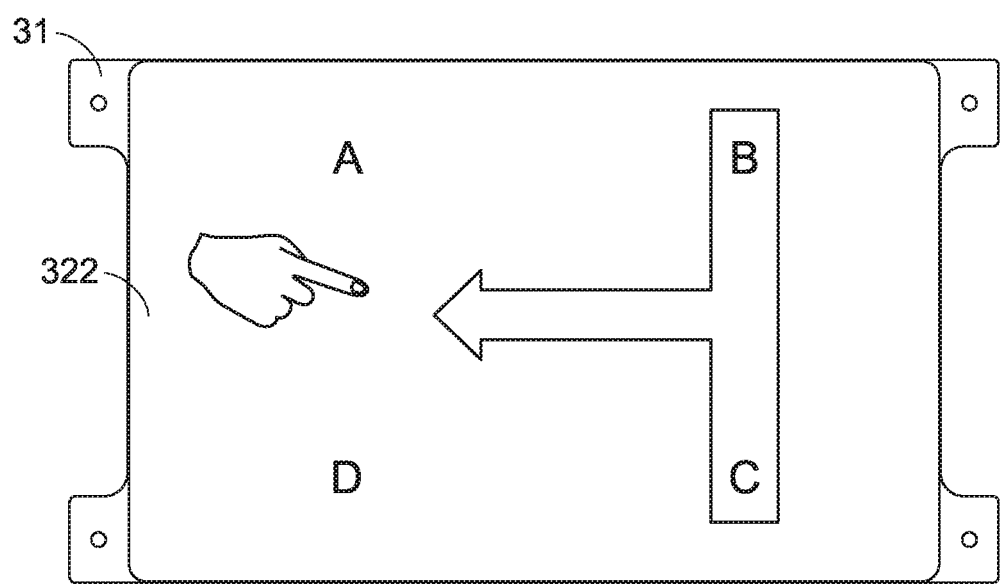

Please refer to FIG. 12B. When the user' finger presses down the left side of the touch member, the protrusion structures at the positions A and D are moved downwardly, the protrusion structures at the positions B and C are fixed and used as fulcrums, and the switch 33 between the positions A, B, C and D is in contact with the substrate 31 and triggered.

Figure 12C:
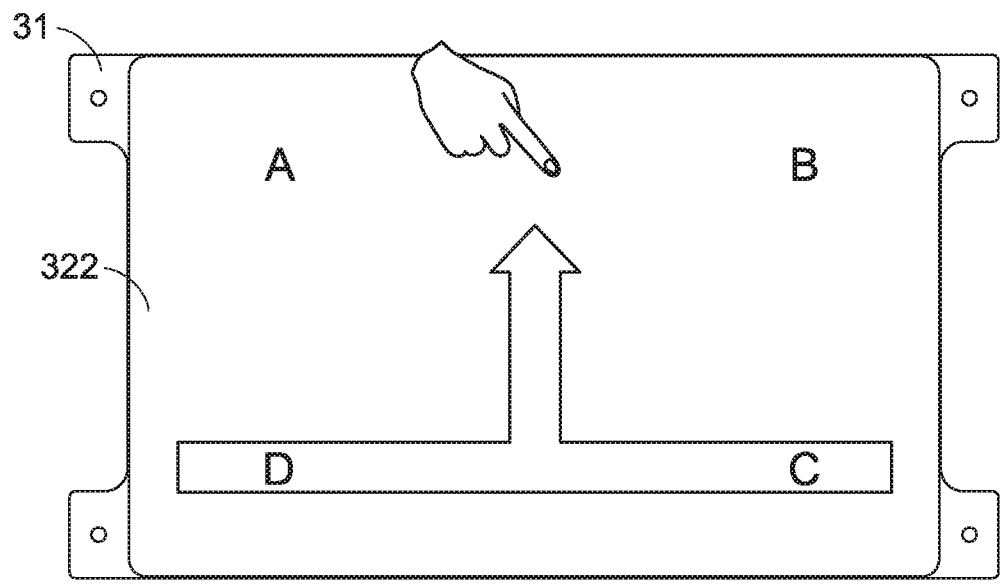

Please refer to FIG. 12C. When the user' finger presses down the upper side of the touch member, the protrusion structures at the positions A and B are moved downwardly, the protrusion structures at the positions C and D are fixed and used as fulcrums, and the switch 33 between the positions A, B, C and D is in contact with the substrate 31 and triggered.

Figure 12D:
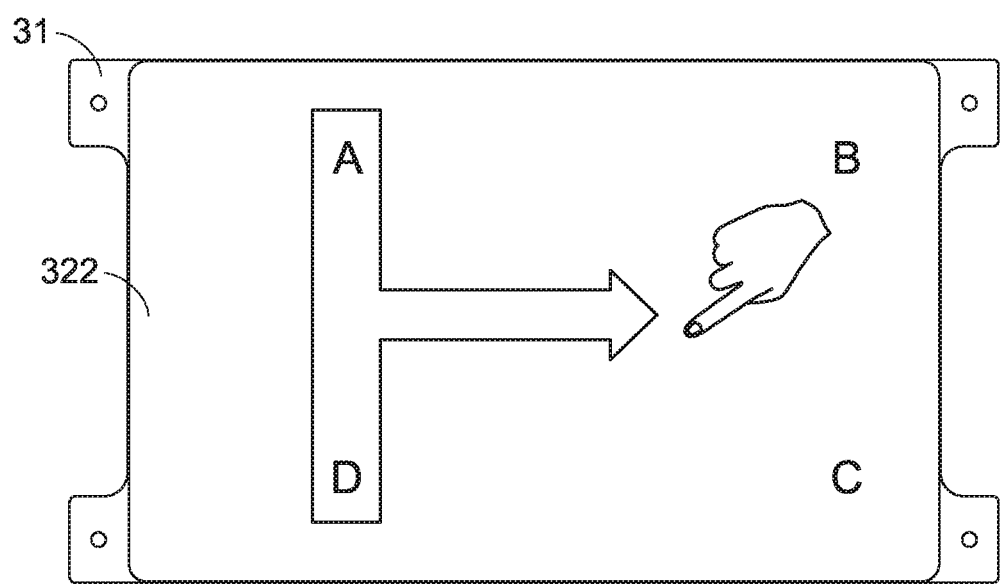

Please refer to FIG. 12D. When the user' finger presses down the right side of the touch member, the protrusion structures at the positions B and C are moved downwardly, the protrusion structures at the positions A and D are fixed and used as fulcrums, and the switch 33 between the positions A, B, C and D is in contact with the substrate 31 and triggered.

From the above descriptions, the present invention provides the touchpad module. In accordance with a feature of the present invention, the touchpad module is equipped with the protrusion structures, the substrate with the first openings and the elastic element. Consequently, when any point of the touch member is pressed down, at least a portion of the touch member is moved downwardly. Consequently, the protrusion structure is moved downwardly to press down at least a portion of the elastic element through the corresponding first openings. At the same time, the switch is in contact with the substrate and triggered. After the pressing force is eliminated, the at least portion of the touch member, the protrusion structures and the at least portion of the elastic element are returned to their original positions. Consequently, when any point of the whole plane of the touch member is pressed down, the switch can be triggered. In other words, the problems that the touch member of the conventional touchpad module can only be pressed down partially can be overcome.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of the computing device, the touchpad module comprising:
   a substrate comprising at least four first openings, which are separated from each other;
   a touch member, wherein a bottom surface of the touch member faces a top surface of the substrate;
   a switch coupled with the bottom surface of the touch member, wherein when any point of the touch member is pressed down, the switch is in contact with the substrate;
   an elastic element located beneath the substrate, and comprising a fixed part and a movable part, wherein the fixed part is coupled with a portion of a bottom surface of the substrate, and the movable part is adjacent to the fixed part and arranged around the fixed part, and the movable part is located beneath the at least four first openings of the substrate; and
   at least four protrusion structures coupled with the touch member and inserted into the corresponding first openings, respectively, wherein when the any point of the touch member is pressed down, the corresponding protrusion structure is moved downwardly to press down a portion of the movable part of the elastic element.

2. The touchpad module according to claim 1, wherein the substrate comprises a triggering part, which is protruded from the substrate and substantially aligned with the switch, wherein when the any point of the touch member is pressed down, the switch is in contact with the triggering part of the substrate.

3. The touchpad module according to claim 1, wherein the movable part of the elastic element comprises at least four second openings, and the at least four second openings are substantially aligned with the corresponding first openings, respectively, wherein a diameter of each second opening is smaller than a diameter of the corresponding first opening, and the at least four protrusion structures are aligned with the corresponding second openings, respectively, wherein when the any point of the touch member is pressed down, the portion of the movable part near the corresponding second opening is pressed down by the corresponding protrusion structure.

4. The touchpad module according to claim 3, wherein the at least four protrusion structures are at least four hollow studs, and the touchpad module further comprises at least four fastening elements corresponding to the at least four hollow studs, respectively, wherein each of the fastening elements is penetrated through the corresponding second opening and tightened into the corresponding hollow stud.

5. The touchpad module according to claim 1, wherein the fixed part of the elastic element is connected with the portion of the bottom surface of the substrate by laser welding, or the fixed part of the elastic element is coupled with the portion of the bottom surface of the substrate through an adhesive layer.

6. The touchpad module according to claim 1, wherein the fixed part of the elastic element is substantially aligned with the switch.

7. The touchpad module according to claim 1, wherein the touchpad module further comprises a reinforcement plate, wherein the reinforcement plate is coupled with the bottom surface of the touch member, and the at least four protrusion structures are coupled with the touch member through the reinforcement plate.

8. The touchpad module according to claim 7, wherein a vertical projection of a peripheral portion of the reinforcement plate is partially overlapped with a vertical projection of an upper part of the fixing frame.

9. The touchpad module according to claim 1, wherein the elastic element further comprises a hollow part, and the hollow part is adjacent to the movable part, wherein the hollow part and the movable part are arranged around the fixed part.

10. The touchpad module according to claim 1, wherein the touch member comprises a circuit board and a covering plate, wherein the covering plate is located over the circuit board, and the switch is connected with a bottom surface of the circuit board.

11. A computing device, comprising:
a casing, having a fixing frame recessed inward;
a processor disposed within the casing; and
a touchpad module disposed within the fixing frame and electrically connected with the processor, wherein the touchpad module comprises:
  a substrate comprising at least four first openings, which are separated from each other;
  a touch member, wherein a bottom surface of the touch member faces a top surface of the substrate;
  a switch coupled with the bottom surface of the touch member, wherein when any point of the touch member is pressed down, the switch is in contact with the substrate;
  an elastic element located beneath the substrate, and comprising a fixed part and a movable part, wherein the fixed part is coupled with a portion of a bottom surface of the substrate, and the movable part is adjacent to the fixed part and arranged around the fixed part, and the movable part is located beneath the at least four first openings of the substrate; and
  at least four protrusion structures coupled with the touch member and inserted into the corresponding first openings, respectively, wherein when the any point of the touch member is pressed down, the corresponding protrusion structure is moved downwardly to press down a portion of the movable part of the elastic element.

* * * * *